United States Patent
Moyer et al.

(10) Patent No.: US 9,223,678 B2
(45) Date of Patent: Dec. 29, 2015

(54) DATA PROCESSOR DEVICE HAVING A DEBUG CONTROL MODULE WHICH SELECTIVELY MODIFIES TRACE MESSAGES

(71) Applicants: William C. Moyer, Dripping Springs, TX (US); Jeffrey W. Scott, Austin, TX (US)

(72) Inventors: William C. Moyer, Dripping Springs, TX (US); Jeffrey W. Scott, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 209 days.

(21) Appl. No.: 13/955,102

(22) Filed: Jul. 31, 2013

(65) Prior Publication Data

US 2015/0039945 A1    Feb. 5, 2015

(51) Int. Cl.
*G06F 11/30* (2006.01)
*G06F 11/36* (2006.01)

(52) U.S. Cl.
CPC ............ *G06F 11/36* (2013.01); *G06F 11/3072* (2013.01); *G06F 11/3082* (2013.01); *G06F 11/3636* (2013.01)

(58) Field of Classification Search
CPC ............ G06F 11/3636; G06F 11/3466; G06F 11/3476; G06F 11/3495; G06F 11/1402; G06F 11/1471; G06F 11/3072; G06F 11/3082
See application file for complete search history.

(56) References Cited

U.S. PATENT DOCUMENTS

| | | | |
|---|---|---|---|
| 5,809,293 A | 9/1998 | Bridges et al. | |
| 6,094,729 A | 7/2000 | Mann | |
| 6,142,683 A | 11/2000 | Madduri | |
| 6,539,389 B1 * | 3/2003 | Geiner | G06F 11/3495 |
| 6,877,114 B2 | 4/2005 | Allen et al. | |
| 7,149,926 B2 | 12/2006 | Ahmad et al. | |
| 7,921,165 B2 * | 4/2011 | Pearson | H04L 12/58 709/205 |
| 2004/0049693 A1 * | 3/2004 | Douglas | 713/200 |
| 2004/0250164 A1 * | 12/2004 | Ahmad et al. | 714/30 |
| 2005/0091373 A1 * | 4/2005 | Ciapala et al. | 709/224 |
| 2010/0064173 A1 | 3/2010 | Pedersen et al. | |
| 2010/0100775 A1 * | 4/2010 | Slutsman et al. | 714/47 |
| 2010/0281304 A1 * | 11/2010 | Moyer et al. | 714/37 |
| 2013/0073532 A1 * | 3/2013 | Bachar et al. | 707/704 |
| 2013/0191434 A1 * | 7/2013 | Smith et al. | 709/201 |
| 2015/0032707 A1 * | 1/2015 | Barykin et al. | 707/694 |

* cited by examiner

*Primary Examiner* — Joseph Schell

(57) ABSTRACT

Upon detecting an occurrence of a watchpoint event for debugging a computer processing system, at least a portion of at least one message in a trace message buffer is flushed when a characteristic of the at least one of the messages matches a specified characteristic.

20 Claims, 6 Drawing Sheets

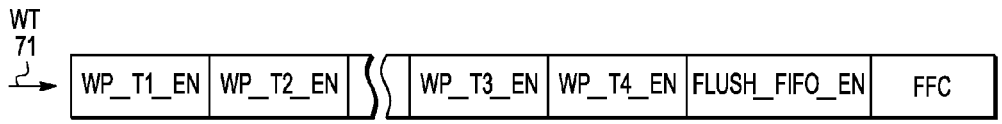

FIG. 3

| BITS | NAME | DESCRIPTION |
|---|---|---|
| 19:16 | FFC | FFC - FIFO FLUSH CONTROL<br>0000 - FIFO FLUSH FUNCTION IS DISABLED<br>0001 - FLUSH FIFO DATA TRACE MESSAGES WHEN SELECTED WATCHPOINT IS ASSERTED<br>0010 - FLUSH OLDEST n% FIFO DATA TRACE MESSAGES WHEN SELECTED WATCHPOINT IS ASSERTED<br>0011 - FLUSH NEWEST m% FIFO DATA TRACE MESSAGES WHEN SELECTED WATCHPOINT IS ASSERTED<br>0100 - FLUSH FIFO WATCHPOINT TRACE MESSAGES WHEN SELECTED WATCHPOINT IS ASSERTED<br>0101 - FLUSH OLDEST p% FIFO WATCHPOINT TRACE MESSAGES WHEN SELECTED WATCHPOINT IS ASSERTED<br>0110 - FLUSH NEWEST q% FIFO WATCHPOINT TRACE MESSAGES WHEN SELECTED WATCHPOINT IS ASSERTED<br>0111 - FLUSH ALL NON-PROGRAM TRACE FIFO TRACE MESSAGES WHEN SELECTED WATCHPOINT IS ASSERTED<br>1000 - FLUSH FIFO TRACE MESSAGES LONGER THAN A SPECIFIC LENGTH, AND SUBSTITUTE A (VERY SHORT) DISCONTINUITY CORRELATION MESSAGE WHEN SELECTED WATCHPOINT IS ASSERTED<br>1001 - TRUNCATE STORED ADDRESS PORTIONS OF SELECTED TRACE MESSAGE TYPES WHEN SELECTED WATCHPOINT IS ASSERTED<br>1010 - TRUNCATE STORED TIMESTAMP PORTIONS OF SELECTED TRACE MESSAGE TYPES WHEN SELECTED WATCHPOINT IS ASSERTED<br>1011 - 1111 - SIMILAR TYPES OF LENGTH, AGE AND % FLUSH CONTROLS FOR MESSAGE TYPES WHEN SELECTED WATCHPOINT IS ASSERTED |

FIG. 4

DATA PROCESSOR DEVICE HAVING A DEBUG CONTROL MODULE WHICH SELECTIVELY MODIFIES TRACE MESSAGES

BACKGROUND

1. Field of the Disclosure

The present disclosure relates to electronic devices, and more data processing device(s) having debug capabilities.

2. Description of the Related Art

Debug protocols, such as the IEEE standard known as IEEE ISTO5001, or the Nexus debug standard, are used to establish real-time debug support for data processing systems that can support real-time debug message generation. Such debugging standards can specify debugging processes that are used in the development of code for a data processor. One technique used in real-time debugging is the use of debug messages that include debug information that is generated by the data processing system. One type of debug information is referred to as trace information, which can include program trace information and data trace information. Program trace information can be generated during program trace messaging, which generates program trace messages that are related to instruction address events of a data processor. Data trace information can be generated during data trace messaging, which generates data trace messages that are related to data information stored at storage locations of the data processor, such as at register locations. For example, program trace messaging can be used to store program trace information that is used during debug operations to determine which program is executed by a data processor, and data trace messaging can be used to store changes of stored data during the debug operation of the data processor.

Trace information can be stored at a First-In First-Out (FIFO) buffer of a data processing system until it is transferred to a debugger that is typically external to the data processor system. However, an issue arises when the FIFO becomes full due to the speed at which the data processor generates trace information being greater than the speed at which the data processor can communicate the debug trace information to the external debugger. In such situations, one or more trade-offs need to be made, each of which can impact the debug capabilities of the data processing system. For example, the data processor can be stalled until the FIFO is no longer full, which can alter the real-time nature of the data processing system. Alternatively, the data processing system can continue to run without storing additional trace information, which results in debug information being lost as the data processing system continues to operate in real-time.

BRIEF DESCRIPTION OF THE DRAWINGS

Embodiments are illustrated by way of example and are not limited in the accompanying figures.

FIG. 3 illustrates, in block diagram form, storage locations used by a portion of the debug module of FIG. 2 in accordance with an embodiment of the present disclosure.

FIG. 4 illustrates, in table form, values for a storage location of FIG. 3 in accordance with an embodiment of the present disclosure.

Skilled artisans appreciate that elements in the figures are illustrated for simplicity and clarity and have not necessarily been drawn to scale.

DETAILED DESCRIPTION

During a debug mode of operation of a data processor, it is determined at the data processor that a watchpoint event has occurred, and in response, a state of the FIFO that stores trace information (trace FIFO) may be changed based on FIFO flush control information. For example, selected entries in the trace FIFO may be invalidated, truncated, or collapsed. These entries may be selected based on characteristics of the stored information in the FIFO entry, such as age, size, priority, or message type. In one embodiment, FIFO flush control information is provided in order to select those entries which are to be invalidated or collapsed (i.e. flushed). The entries selected for invalidation, truncation, or collapse may correspond to those messages which have lower priority or usefulness as compared to other messages stored in the trace FIFO. Flushing of a trace FIFO entry may refer to invalidating, truncating, or collapsing an entry stored in the trace FIFO or removing the trace FIFO entry. By selectively invalidating, truncating, or collapsing entries stored in the trace FIFO, additional capacity is gained in the FIFO for higher priority messages. Furthermore, through the use of the FIFO flush control information, the types of entries in the trace FIFO which are selected for removal can be varied. Various aspects of the present disclosure will be better understood with reference to FIGS. 1-8 discussed below.

Figure 1:
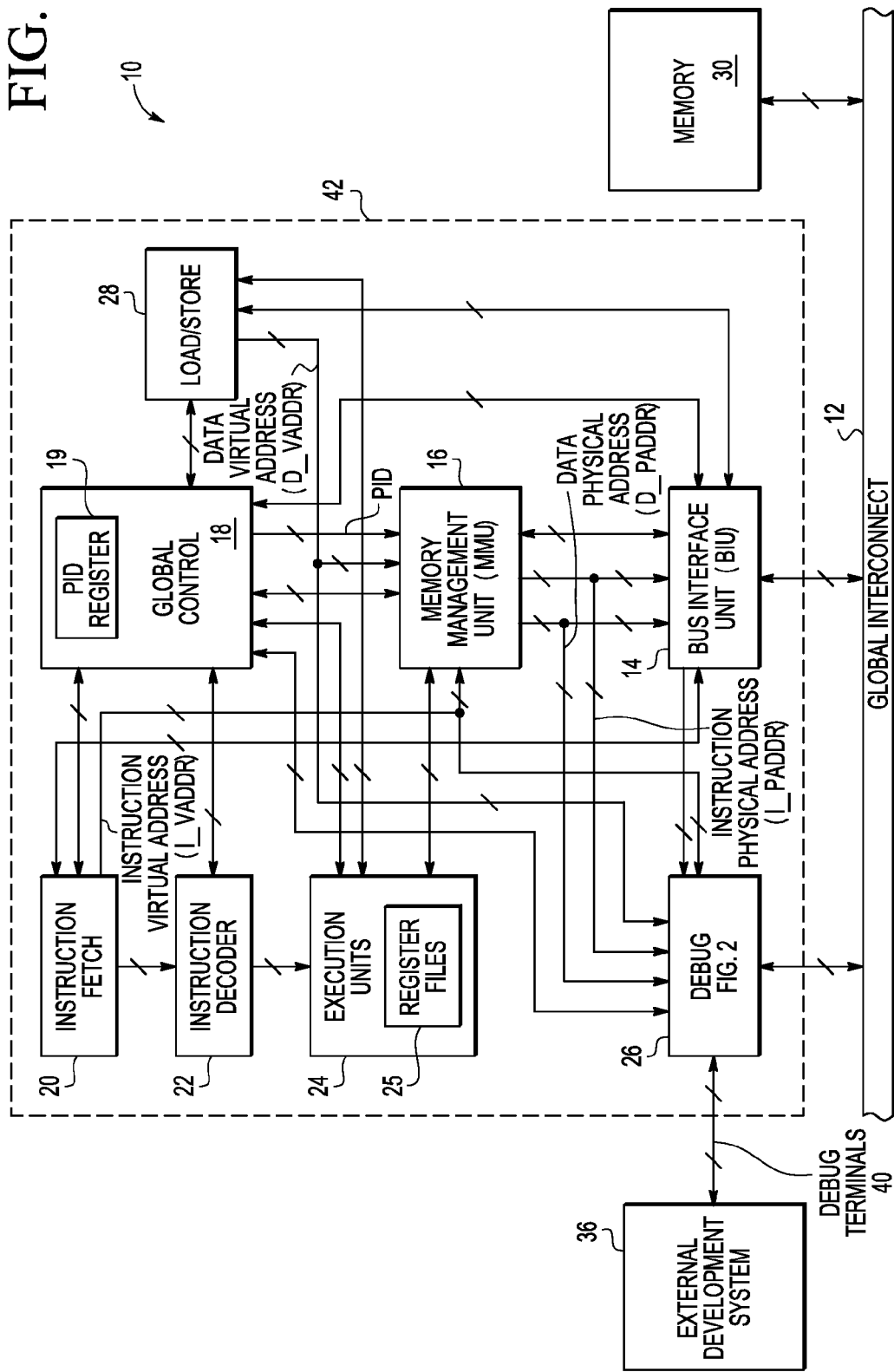
FIG. 1 illustrates, in block diagram form, a data processing system having debug message generation in accordance with an embodiment of the present disclosure.

Illustrated in FIG. 1 is an exemplary data processing system 10 that supports trace messaging during a debug mode of operation. Within data processing system 10 is a global interconnect 12. In one form global interconnect 12 is a system bus. Other forms of interconnect may be used including, for example, crossbars, point-to-point connections, and optical and wireless transmission techniques. In addition, there may be multiple other interconnects of the same or different type as interconnect 12 that are used in the same or similar manner as that described herein. A bus interface unit (BIU) 14 is connected to global interconnect 12 via a bidirectional interconnect. In one form the bidirectional interconnect is a bidirectional multiple conductor bus wherein multiple conductor buses herein are represented with a slash across the conductor. BIU 14 is bidirectionally connected to memory management unit (MMU) 16. MMU 16 is connected to a first input/output terminal of a global control module 18 via a bidirectional multiple conductor bus. A second input/output terminal of global control module 18 is connected to a first input/output terminal of an instruction fetch unit 20 via a bidirectional multiple conductor bus. Instruction fetch unit 20 has an output connected to an input of an instruction decoder 22 via a multiple conductor bus. An output of instruction decoder 22 is connected to an input of execution units 24. In one form, execution units 24 include at least one arithmetic logic unit, at least one floating point unit and at least one multiplier module. Within the execution units 24 are register files 25. An input/output terminal of instruction decoder 22 is connected to a third input/output terminal of the global control module 18. A first input/output terminal of execution units 24 is connected to a fourth input/output terminal of global control module 18. Execution units 24 and instruction fetch unit 20 are also bidirectionally connected to MMU 16. A load/store unit 28 has a first input/output terminal bidirectionally connected to a sixth input/output terminal of global control module 18. Load/store unit 28 has a second input/output terminal connected to a first input/output terminal of BIU 14. Load/store unit 28 has a third input/output terminal connected to a second input/output terminal of execution units 24. A second input/output terminal of BIU 14 is connected to a seventh input/output terminal of global control module 18. An output of load/store unit 28 provides a data virtual address (D_VADDR) and is connected to a first input of MMU 16 and a first input of debug module 26. An output of instruction fetch unit 20 provides an instruction virtual address (I_VADDR) and is connected to a second input of MMU 16 and a second input of debug module 26. A first output of MMU 16 provides a data physical address (D_PADDR) and is connected to a first input of BIU 14 and to a second input of debug module 26. A second output of MMU 16 provides an instruction physical address (I_PADDR) and is connected to a second input of BIU 14 and to a third input of debug module 26.

A memory 30 is connected to global interconnect 12 via a bidirectional interconnect. Debug module 26 has a second input/output terminal connected to a plurality of debug terminals 40 via bidirectional multiple conductors. The plurality of debug terminals 40 is connected to an external development system 36 that is an external debug tool commonly referred to as a debugger or external debugger, which reconstructs the program flow being executed by the system using various debug information and a local image of code memory contents. In the illustrated form BIU 14, MMU 16, global control module 18, instruction fetch unit 20, instruction decoder 22, execution units 24 with register files 25, debug module 26 and load/store unit 28 collectively form a data processor 42 as indicated by the dashed line grouping in FIG. 1. While various modules of FIG. 1, and other figures, are illustrated in a segregated locations with specific connections, it will be understood that such modules may also be implemented in a distributed manner and be included within any of the various other system blocks of data processing system 10. For example, the storage locations 71/72 illustrated at the debug module 26 embodiment of FIG. 2 can be part of the register files 25 or other portion of the data processor 42. Also, in the illustrated embodiment, global control 18 includes a process identifier (PID) register 19 that stores a process identifier (PID) for the currently executing process. Global control 18 also provides the PID to MMU 16.

In operation, data processor 42 can communicate with memory 30 and other devices (not shown) via global interconnect 12. Information communicated between memory 30 and other devices transfers through BIU 14. Instruction fetch unit 20 retrieves data processor instructions (i.e. processor instructions) from BIU 14 under control of global control module 18. The retrieved instructions are sequentially communicated to instruction decoder 22 for decoding under control of global control module 18. Execution units 24 execute instructions and generate data that is either stored in a cache (not shown) or placed in the memory 30 via global control module 18, BIU 14 and global interconnect 12. Debugging of the operation of data processor 42 and data processing system 10 is performed by the use of debug module 26 that generates debug information for analysis by external development system 36. A test or debug mode of operation is entered in response to activation of such from external development system 36.

In the illustrated form, debug module 26 is configured to receive address information from one or more of global interconnect 12 and from locations internal to data processor 42 including data virtual addresses, data physical addresses, program (instruction) virtual addresses, program physical addresses. Debug module 26 is configured to receive data information from BIU 14 and load/store unit 28, and information from global control 18. A data address is an address where data resides whereas a program address is an address where an instruction resides. Program virtual addresses are provided from instruction fetch unit 20 to the debug module 26 and MMU 16. A virtual address is an un-translated address which requires some further processing or translating to obtain a translated address of the physical storage location where the information is residing. MMU 16 provides instruction physical addresses to BIU 14 and debug module 26 by translating addresses of virtual pages of memory to corresponding physical page addresses. Pages of memory are contiguous locations which are grouped, and typically have a size that is a power of 2, such as for example a 4 Kbyte page, a 16 Kbyte page, a 64 Kbyte page, etc. Load/store unit 28 provides data virtual addresses to debug module 26 and to MMU 16. MMU 16 provides data physical addresses to BIU 14 and debug module 26. Debug module 26 forms a debug message for external development system 36 based upon information at one or more of the received addresses, as will be discussed in more detail below.

Figure 2:
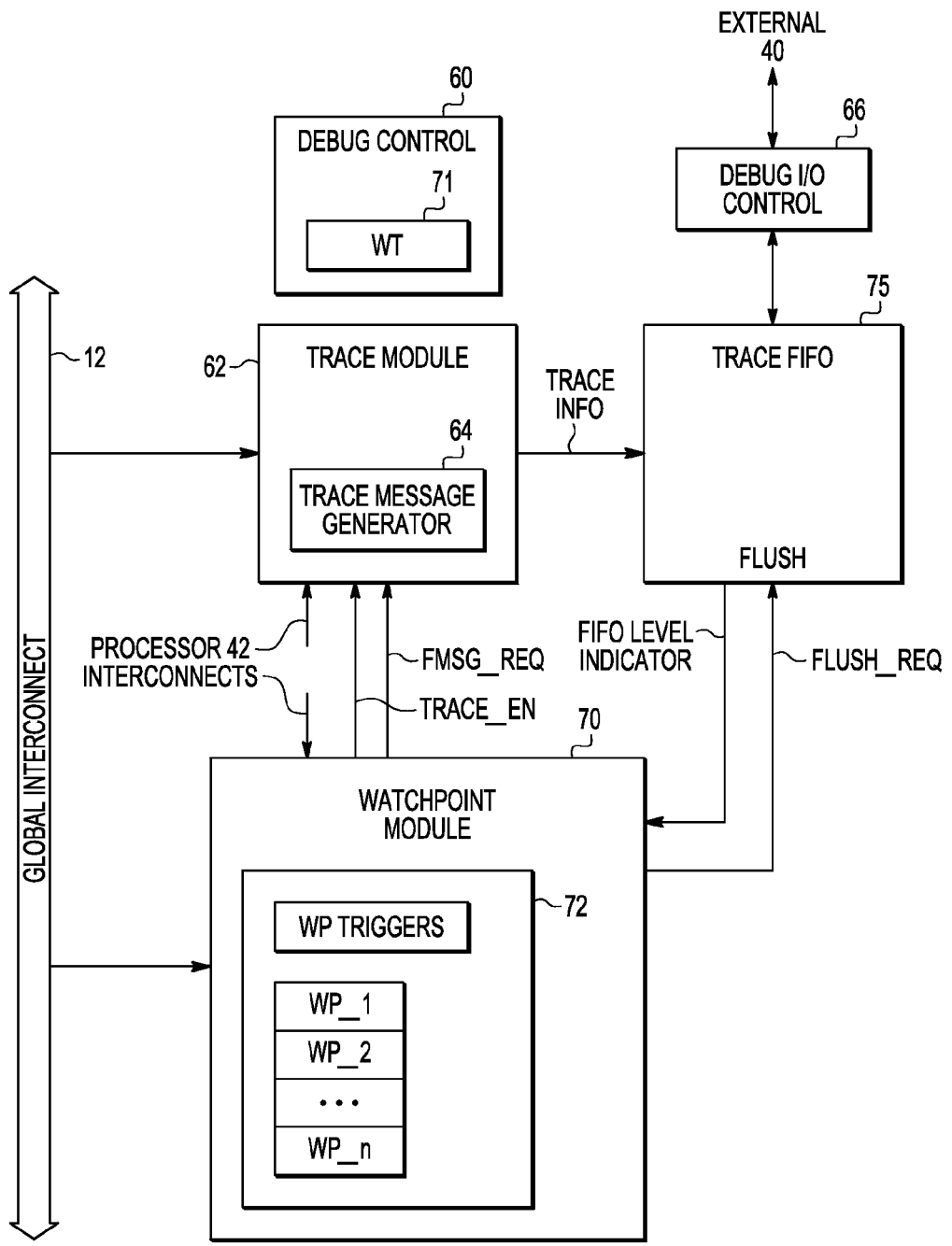
FIG. 2 illustrates, in block diagram form, a portion of a debug module of FIG. 1 in accordance with an embodiment of the present disclosure.

Illustrated in FIG. 2 is an exemplary embodiment of a portion of the debug module 26 of FIG. 1 that includes debug control module 60, trace module 62, watchpoint module 70, debug input/output (I/O) module 66, and trace FIFO 75. Debug control module 60 is used to control operation of the debug module 26, and can communicate with the various modules of FIG. 2. Trace module 62 monitors operation of the data processor 42, and in response to receiving a trace enable indicator (TRACE_EN) from the watchpoint module 70, will capture and provide trace information to FIFO 75, which stores the trace information in a next available storage location, which can be implemented at an array of storage locations (not illustrated). Watchpoint module 70 monitors operation of the system 10 for the occurrence of enabled watchpoint events, and notifies various portions of the debug module 26 in response to a watchpoint event being detected. While a watchpoint can be triggered by any one of a number of types of events, such as a particular address being accessed, a particular data value being stored, the like, and combinations thereof, for purposes of discussion, it is presumed a watchpoint is based upon a particular address being accessed. For example, the watchpoint module 70 can assert signal TRACE_EN, a trace enable indicator, to facilitate capturing trace information by the trace module 62. For purposes of discussion, various connections between portions of the debug module 26 and between global interconnect 12 are illustrated at FIG. 2 with arrows indicative of a particular direction of data flow with respect to an embodiment described herein. It will be appreciated, however, that the arrow indications are not intended to indicate a connection can only transmit information in a unidirectional manner.

Debug control module 60 includes a register 71 that can store information used to control various operational states of the debug control module 26. For example, register 71 can include a field DEBUG_EN that when asserted enables operation of the debug module 26, a field PGM_TRACE_EN that when asserted enables program trace messaging, a field DATA_TRACE_EN that when asserted enables data trace messaging, and the like. Debug control module 60 is connected (not shown) to the debug I/O control module 66. During operation, the debug control module 60 can receive external information via the debug I/O module 66 including commands that are executed by the debug control module 60. An example of a command that can be executed by the debug control module 60 includes commands that enable/disable debug operation, e.g., by writing to register 71.

When enabled, the trace module 62 can acquire trace information from various locations, including: information from internal resources of the data processor 42, such as information from interconnects within processor 42; information at global interconnect 12; and the like. In response, the trace module 62 will have trace message generator 64 generate trace messages that are provided to the trace FIFO 75 for buffering prior to being provided to the external development system 36 (FIG. 1) for trace analysis. In particular, the debug I/O control module 66 can interface with trace FIFO 75 to access queued trace information, such as trace messages, to provide the messages via the external interconnect 40 to external development system 36.

When enabled, trace module 62 monitors operations of the data processing system 10 based upon various debug control information. Specifically illustrated at FIG. 2 is a connection to global interconnect 12 that allows address and data at global interconnect 12 to be monitored, and a connection to interconnects internal to the data processor 42 so that information transmitted within processor 42 can be monitored. According to one embodiment, data trace messaging and program trace messaging by trace module 62 can be enabled by debug control module 60 directly in response to the debug control module 60 executing a command. According to another embodiment, data trace messaging and program trace messaging by trace module 62 are enabled/disabled by watchpoint module 70 in response to the occurrence of watchpoint events. For example, FIG. 3 illustrates a particular embodiment of a set of registers 72, labeled WP_TRIGGERS, that can be used to enable/disable trace messaging. The illustrated watchpoint trigger register includes watchpoint type enable fields labeled, WP_T1_EN; WP_T2_EN; WP_T3_EN; WP_T4_EN; and FLUSH_FIFO_EN. The illustrated watchpoint trigger register also includes a FIFO Flush control field (FFC), which, as will be described, may be used to define the flushing to be performed on the FIFO in response to a flush FIFO watchpoint. Each of the watchpoint type enable fields of FIG. 3, correspond to different types of watchpoints which can trigger based upon different types of information, and cause the debug module to perform different operations, the like, and combinations thereof.

According to one embodiment, each of the watchpoint type enable register fields WP_T1_EN, WP_T2_EN, WP_T3_EN, and WPP_T4_EN of FIG. 3 can be a multi-bit field, in which one of the possible multi-bit values of a register field of FIG. 3 indicates that that register field's corresponding watchpoint type is disabled, and other possible multi-bit values of the register field identify corresponding watchpoint registers, respectively, that store values used to determine the occurrence of a watchpoint event of the corresponding watchpoint type. For example, each of these watchpoint type enable fields of FIG. 3 can be a three-bit field. A watchpoint enable field having a value of zero (000b) indicates that that field's corresponding watchpoint type is disabled; a binary value of one (001b) indicates that the field's corresponding watchpoint type is enabled and that watchpoint WP_1 of the watchpoint module 70 is used to determine the occurrence of a watchpoint event; a value of two (010b) indicates that the watchpoint type corresponding to the field is enabled and that watchpoint WP_2 of the watchpoint module is used to determine the occurrence of a watchpoint event; other watchpoints can be indicated for use in a similar manner.

Examples of different watchpoint types include: program trace enable watchpoints that enable program tracing by the trace module 62 in response to its watchpoint condition being met, such as in response to an executed address matching a value stored at an indicated watchpoint register; program trace disable watchpoints that disable program tracing by the trace module 62 in response to its watchpoint condition being met, such as in response to an executed address matching a value stored at an indicated watchpoint register; data trace enable watchpoints that enable data trace messaging by the trace module 62 in response to its watchpoint condition being met, such as in response to an executed address matching a value stored at an indicated watchpoint register; data trace disable watchpoints that disable data tracing by the trace module 62 in response to its watchpoint condition being met, such as in response to an executed address matching a value stored at an indicated watchpoint register.

Still referring to FIG. 3, the flush FIFO watchpoint type enable register field FLUSH_FIFO_EN is also a multi-bit field. In one embodiment, it may be a 32 bit field in which a value of zero indicates that the flush FIFO watchpoint type is disabled. If non-zero, the 32 bits allows the selection of one or more of 32 watchpoints stored, for example, in watchpoint registers 72, to use to trigger a flush FIFO operation as defined by FFC. That is, the FIFO control watchpoint results in a change in the state of FIFO 75 in response to its watchpoint condition being met, such as in response to an executed address matching a value stored at an indicated watchpoint register, or the like. The change in state of FIFO 75 may be defined by the operation(s) selected by the settings in the control field FFC.

For example, FIG. 4 illustrates, in table form, an example of values for the FFC field. In one embodiment, the FFC field is a 4-bit value which defines various types of operations that may be performed in response to occurrence of a flush FIFO watchpoint. In alternate embodiment, the FFC field may include more or less bits, as needed, to define the various desired operations. Referring to the example of FIG. 4, a binary value of "0000" indicates that the FIFO flush function is disabled. A binary value of "0001" indicates that the data trace messages of FIFO 75 are flushed when a selected watchpoint is asserted. A binary value of "0010" indicates that the oldest n % of data trace messages of FIFO 75 are flushed when a selected watchpoint is asserted. A binary value of "0011" indicates that the newest m % of data trace messages of FIFO 75 are flushed when a selected watchpoint is asserted. A binary value of "0100" indicates that the watchpoint trace messages of FIFO 75 are flushed when a selected watchpoint is asserted. A binary value of "0101" indicates that the oldest p % of watchpoint trace messages of FIFO 75 are flushed when a selected watchpoint is asserted. A binary value of "0110" indicates that the newest q % of watchpoint trace messages are flushed when a selected watchpoint is asserted. Note that the values of n, m, p, and q can be any value as desired. For example, these values can be determined by testing system 10 to determine which values provide for the desired performance. A binary value of "0111" indicates that all non-program trace messages of FIFO 75 are flushed when a selected watchpoint is asserted. A binary value of "1000" indicates that any trace message in FIFO 75 that is longer than a specified length is flushed and substituted with a discontinuity correlation message when a selected watchpoint is asserted. The discontinuity correlation message may be very short, such as, for example, containing only a message type and a discontinuity indicator field. A binary value of "1001" indicates that any stored address portions of selected trace message types in FIFO 75 are truncated when a selected watchpoint is asserted. A binary value of "1010" indicates that any stored timestamp portions of selected trace message types in FIFO 75 are truncated when a selected watchpoint is asserted. Note that truncation can indicate fully deleting or partially deleting one or more predetermined sub-fields of that portion. Also, note that the selected message types can be determined based on the desired storage savings for system 10. In some cases, the user may determine which messages contain more useful information than others, and may base the selection of one or more message types to delete or truncate on which types provide less useful message or debug information than selected other types. Note that the remaining binary values of "1011"-"1111" may be used for similar types of length, age and percentage flush controls for other message types when a selected watchpoint is asserted.

Therefore, note that the FFC field may be used to define which characteristics of a message within FIFO 75 are to be used in determining whether to remove or truncate the message. For example, the characteristics used to determine whether an entry is removed or truncated may include the age of the message, size or length of the message, priority of the message, source of the message etc. In this manner, the flushing or collapsing of FIFO 75 can be better controlled to ensure that appropriate messages get removed from FIFO 75 or kept within FIFO 75 in order to achieve the desired performance of FIFO 75.

Figure 5:
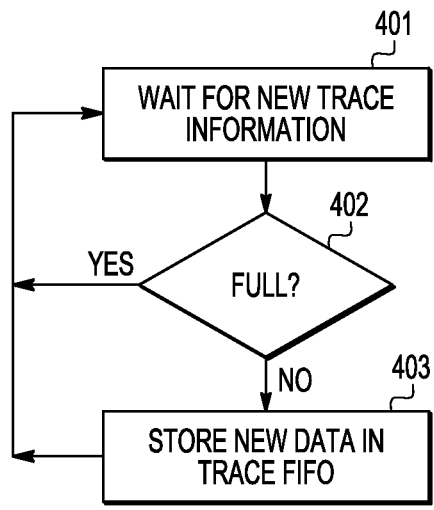
FIG. 5 illustrates, in flow diagram form, a particular method of operation of the trace FIFO of FIG. 2 in accordance with an embodiment of the present disclosure.

FIG. 5 illustrates, in flow diagram form, a method of a particular embodiment of operation of FIFO 75, wherein new trace data from trace module 62 is lost in response to response to FIFO 75 being full. The method of FIG. 5 waits at block 401 until new trace information is ready to be stored, e.g., at trace FIFO 75. In response to receiving the new trace information, flow proceeds to block 402, where it is determined whether trace FIFO 75 is full. If so, flow returns to block 401 to wait for additional new trace information, without storing the current new trace information at the FIFO 75; otherwise, flow proceeds to block 403. At block 403, the current new trace information is stored at the trace FIFO 75, and flow returns to block 401.

Figure 6:
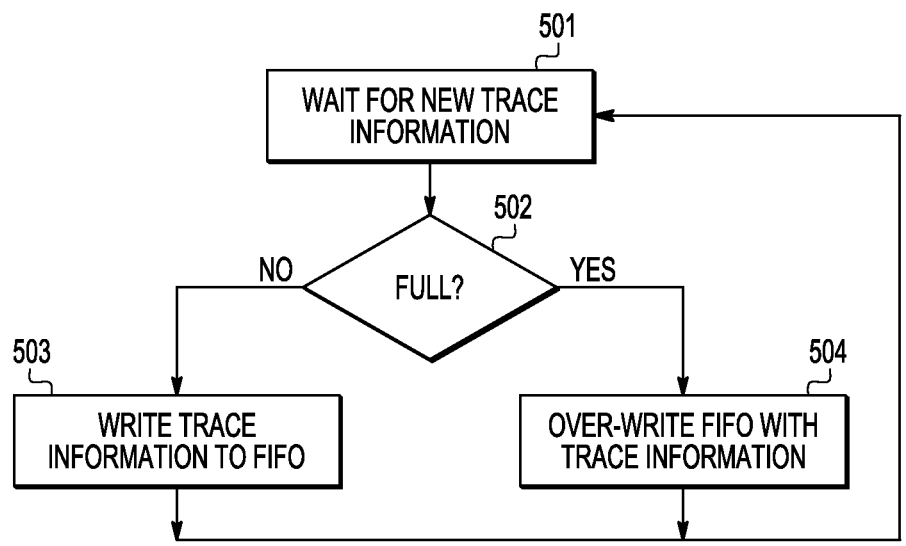
FIG. 6 illustrates, in flow diagram form, a particular method of operation of the trace FIFO of FIG. 2 in accordance with an embodiment of the present disclosure.

The method of FIG. 6 waits at block 501 until new trace information is ready to be stored, e.g., at trace FIFO 75. At block 502, it is determined whether the trace FIFO 75 is full. If trace FIFO 75 is not full, flow proceeds to block 503 where the new trace information is added to the trace FIFO 75 without affecting any other previously stored trace information; otherwise, in response to the FIFO 75 being full, flow proceeds to block 504 where the new trace information is stored at the trace FIFO 75 by flushing an existing FIFO entry containing previously stored debug information. For example, the oldest debug information can be flushed. It will be appreciated that the manner of operation of debug module 26 in response to FIFO 75 being full can also be handled in other manners. For example, the data processor 42 can be stalled in response to the FIFO 75 being full, thus preventing execution of further instructions until space is available at the FIFO 75.

In one embodiment, the debug module 26 supports one or more FIFO watchpoint types, including a FIFO flush watchpoint (FLUSH_FIFO) that may result in trace information queued at FIFO 75 being flushed and thereby preventing the flushed trace information from being communicated via external interconnect 40. As described above, a FIFO flush watchpoint event can occur in response to a watchpoint value stored at one or more of the watchpoint registers WP_1-WP_n matching the address at global interconnect 12. Also, as described above, selected entries of FIFO 75 may be flushed or truncated in accordance with the settings of control field FFC.

Upon the determination that a flush should occur in response to a flush watchpoint event, watchpoint module 70 can assert a FLUSH_REQ indicator. This indicator can also provide the information necessary based on FFC so as to perform the flushing or truncating of the appropriate entries of FIFO 75. In response to the asserted FLUSH_REQ indicator, predetermined entries or portions of entries currently stored in the trace FIFO 75 will be flushed in accordance with FFC. In response to the asserted FMSG_REQ indicator, trace module 62 generates a trace discontinuity message that is stored in the flushed or truncated FIFO that indicates that the FIFO 75 has been flushed or truncated.

Figure 7:
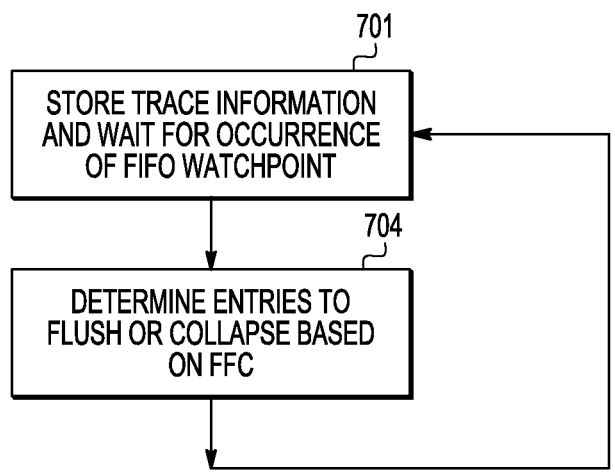
FIG. 7 illustrates, in flow diagram form, a particular method of operation of the debug module of FIG. 1 in accordance with an embodiment of the present disclosure.

FIG. 7 illustrates a particular method of operation of the debug module of FIG. 1 in accordance with an embodiment. The method begins at block 701 in which the debug module 26 is collecting trace information that is being stored at FIFO 75 in a normal manner while the watchpoint module 70 waits for the occurrence of a FIFO control watchpoint, e.g., a watchpoint that controls the manner in which the FIFO operates when debug messaging is enabled. Flow proceeds to block 704 in which, in response to the occurrence of a FIFO control watchpoint event, the entries of FIFO 75 to flush or collapse are determined based on FFC. Furthermore, a correlation message may be stored within FIFO 75 to indicate that at least a portion of FIFO 75 was flushed or collapsed (e.g. to indicate that at least a portion of one or more messages of FIFO 75 has been removed). The values for FFC described above in reference to FIG. 4 provides various examples on how different characteristics of a message may be used to flush, truncate, or collapse messages of one or more predetermined types stored within FIFO 75. That is, upon occurrence of a FIFO control watchpoint event, each of the messages within FIFO 75 can be examined to determine one or more characteristics of the message, in which this characteristic is used to determine whether the message is removed or truncated. Examples of the characteristics which may be used to make the determination is size of the message, priority of the message, or source of the message. In an alternate embodiment, upon occurrence of a FIFO control watchpoint event, the flushing of FIFO 75 in accordance with FFC may only be performed if FIFO 75 has achieved a predetermined fullness threshold.

Figure 8:
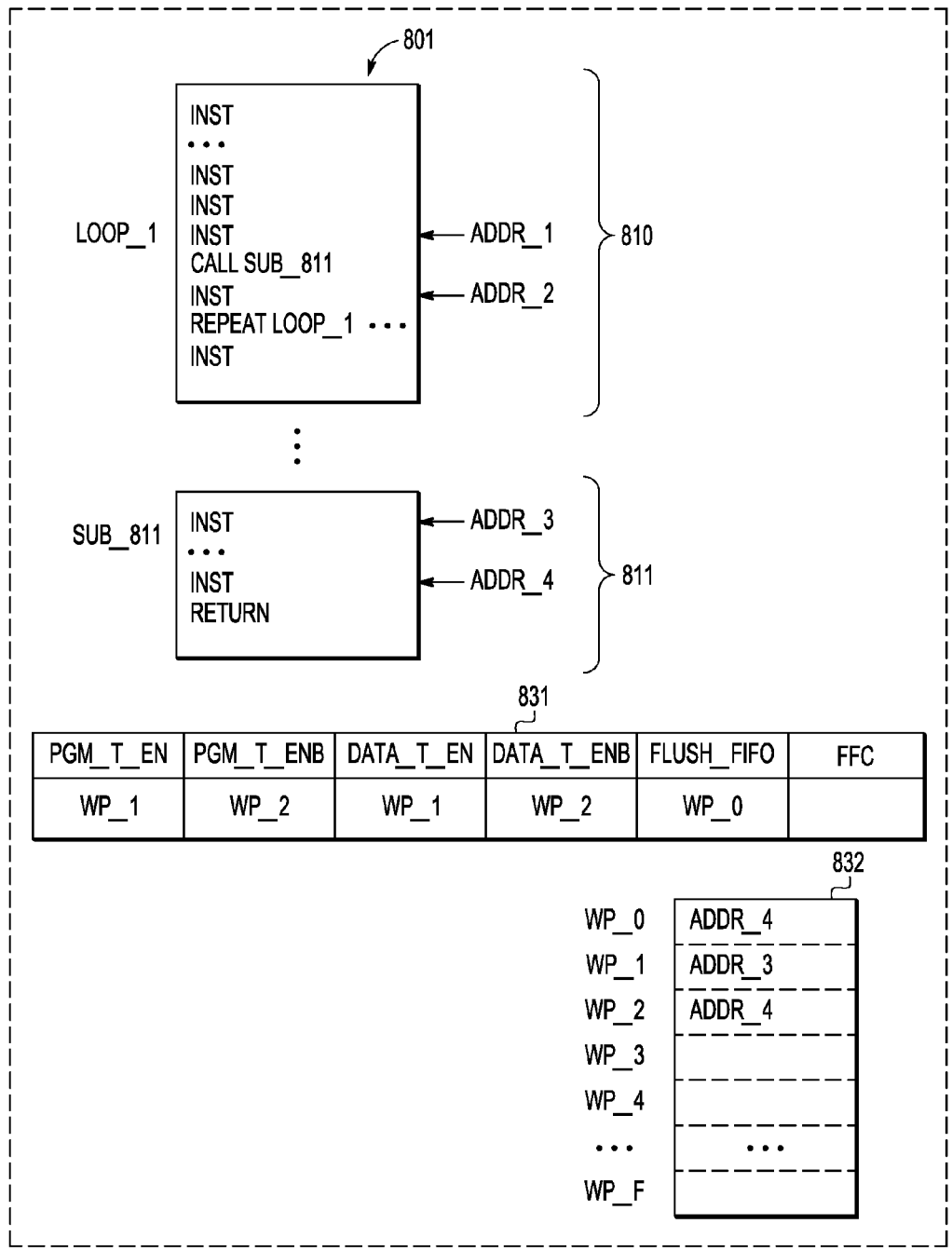
FIG. 8 illustrates a particular embodiment of program memory and debug register states for the system of FIG. 1.

FIG. 8 illustrates a block diagram of a portion of the system 10, including a particular sequence of program code 801 that is being executed, a watchpoint trigger enable register 831, and watchpoint registers 832. The sequence of program code 801 includes a code portion 810 that includes a loop, labeled LOOP_1, that can be repeatedly executed in rapid succession in response to a repeat instruction that defines the end of the loop. A subroutine, labeled SUB_811, that is called in code portion 810 is executed each time LOOP_1 is executed.

The watchpoint trigger enable register 831 and watchpoint register 832 have been configured to perform program trace messaging and data trace messaging when executing the SUB_811, which begins at address ADDR_3 and ends at address location ADDR_4. In particular, a program trace enable watchpoint has been enabled by asserting field location PGM_T_EN of register 831 to a value corresponding to watchpoint WP_1 of watchpoint register 832. Since watchpoint WP_1 has been programmed with a value of ADDR_3, which is the location of the first instruction of subroutine SUB_811, program trace messaging will begin when execution of subroutine SUB_811 begins. Similarly, data trace messaging is enabled when execution of subroutine SUB_811 begins, by virtue of field location DATA_T_EN of register 831 also being asserted to the value corresponding to watchpoint WP_1. Program and data trace messaging are disabled when subroutine SUB_811 is exited, by virtue of field locations PGM_T_ENB and DATA_T_ENB of register 831 being asserted to a value corresponding to watchpoint WP_2, which stores an address value ADDR_4 that corresponds to the last instruction (ADDR_4) of subroutine SUB_811.

By enabling data and program trace messaging when executing subroutine SUB_811, assuming no other watchpoints have been enabled, program and trace information will be stored at the trace FIFO of the debug module each time the subroutine SUB_811 is called. However, for problem code that is non-deterministic and executed many times before failure, such as code associated with subroutine SUB_811, it is very difficult to capture data around the silicon failure because the FIFOs are very likely to overflow due to the code being executed too many times, and at such a high rate, such that trace information is stored at the trace FIFO faster than it can be communicated to an external debug tool. The FLUSH_FIFO watchpoint can be used to address this problem. In particular, FIG. 8 illustrates that a FIFO flush watchpoint has been enabled by asserting field location FLUSH_FIFO of register 831 to a value corresponding to watchpoint WP_0. Since watchpoint WP_0 has been programmed with a value of ADDR_4, which is the location of the return command of subroutine SUB_811, upon returning from subroutine, a flush of FIFO 75 will be performed in accordance with FFC. That is, as described in the example of FIG. 7, messages of FIFO 75 may be flushed, collapsed, truncated, etc., based on the characteristics of the messages, such as age, type, or length. The value of FFC can be set in order to flush FIFO 75 as desired. It will be appreciated that by providing the ability to clear, collapse, or truncate the trace FIFO in this manner it can be ensured that there is storage space available for storing trace messages each time the subroutine SUB_811 is being executed.

It will be appreciated that while the present disclosure has been described with respect to a particular embodiment, many other embodiments may be apparent to those of skill in the art upon reviewing the disclosure.

In addition, other embodiments may be used or derived from the disclosure, such that a structural substitution, logical substitution, or another change may be made without departing from the scope of the disclosure. Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

The following includes various embodiments of the present invention.

Item 1 includes a data processing system includes an interconnect; a central processing unit coupled to the interconnect; a memory coupled to the interconnect, the memory is accessed by the central processing unit via the interconnect; and a debug circuit coupled to the interconnect. The debug circuit includes a trace module; a watchpoint module; a trace message buffer; and a debug control module configured to detect a specified system event; examine a plurality of messages in the trace message buffer for at least one characteristic; and selectively remove at least a portion of one or more of the messages that have the at least one characteristic. Item 2 includes the system of item 1, wherein the at least one characteristic includes size of a message. Item 3 includes the system of item 1 wherein the at least one characteristic includes a source of a message. Item 4 includes the system of item 1 wherein the at least one characteristic includes a priority of a message. Item 5 includes the system of item 1 wherein the debug control module is further configured to include a correlation message in the trace message buffer to indicate when at least a portion of one or more of the messages has been removed. Item 6 includes the system of item 1 wherein the debug control module is further configured to compress remaining messages in the trace message buffer when at least a portion of one or more of the messages has been removed. Item 7 includes the system of item 1 wherein the debug control module is further configured to remove the at least a portion of one or more of the messages that have the at least one characteristic based on the fullness of the trace message buffer. Item 8 includes the system of item 5 wherein the at least a portion of one or more of the messages includes one of a group consisting of an address portion, a timestamp portion, and a process identifier portion. Item 9 includes the system of item 5 wherein the debug control module is further configured to remove one of a group consisting of: a specified percentage of the oldest of the plurality of messages, a specified percentage of the newest of the plurality of messages, non-program messages. Item 10 includes the system of item 3 wherein the debug control module includes a control register having a parameter that indicates whether the ability to remove the at least a portion of one or more of the messages is enabled.

Item 11 includes a method including detecting an occurrence of a watchpoint event for debugging a computer processing system; flushing at least a portion of at least one of a plurality of messages in a trace message buffer in the computer processing system upon detecting the occurrence of the watchpoint event, wherein a characteristic of the at least one of the messages matches a specified characteristic. Item 12 includes the method of item 11 wherein the flushing is performed to enable the trace message buffer to accommodate additional messages associated with the watchpoint event. Item 13 includes the method of item 11 and further includes setting a flush control parameter to enable or disable the flushing. Item 14 includes the method of item 11 and further includes adding a correlation message in the trace message buffer to indicate when the at least a portion of one or more of the messages has been flushed. Item 15 includes the method of item 11 wherein the at least a portion of the at least one of the plurality of message includes one of a group consisting of an address portion, a timestamp portion, and a process identifier portion. Item 16 includes the method of item 11 wherein the specified characteristic is one of a group consisting of: a specified percentage of the oldest of the plurality of messages, a specified percentage of the newest of the plurality of messages, non-program messages, a specified priority of a message, and a specified length of a message. Item 17 includes the method of item 11 and further includes compressing remaining messages in the trace message buffer when the at least a portion of one or more of the messages has been flushed. Item 18 includes the method of item 11 and further includes flushing the at least a portion of the one or more of the messages based on a capacity of the trace message buffer and a number of messages in the trace message buffer that do not match the specified characteristic. Item 19 includes the method of item 16 wherein the plurality of messages are data trace messages. Item 20 includes the method of item 17 wherein the plurality of messages are watchpoint trace messages.

What is claimed is:

1. A data processing system comprising:
   an interconnect;
   a central processing unit coupled to the interconnect;
   a memory coupled to the interconnect, the memory is accessed by the central processing unit via the interconnect;
   a debug circuit coupled to the interconnect, the debug circuit including:
      a trace module;
      a watchpoint module;
      a trace message buffer;
      a debug control module configured to
         detect a specified system event,
         examine a plurality of messages in the trace message buffer for at least one characteristic, and
         selectively remove at least a portion of one or more of the plurality of messages that have the at least one characteristic; and
      a control register having a parameter that indicates whether the ability to remove the at least a portion of one or more of the plurality of messages is enabled.

2. The system of claim 1 wherein:
   the at least one characteristic includes a source of a message.

3. The system of claim 1 wherein:
   the at least one characteristic includes a priority of a message.

4. The system of claim 1 wherein the debug control module is further configured to:
   include a correlation message in the trace message buffer to indicate when at least a portion of one or more of the messages has been removed.

5. The system of claim 4 wherein the at least a portion of one or more of the messages includes one of a group consisting of an address portion, a timestamp portion, and a process identifier portion.

6. The system of claim 4, wherein the debug control module is further configured to:
   remove one of a group consisting of: a specified percentage of the oldest of the plurality of messages, a specified percentage of the newest of the plurality of messages, non-program messages.

7. The system of claim 1 wherein the debug control module is further configured to:
   compress remaining messages in the trace message buffer when at least a portion of one or more of the messages has been removed.

8. The system of claim 1 wherein the debug control module is further configured to:
   remove the at least a portion of one or more of the messages that have the at least one characteristic based on the fullness of the trace message buffer.

9. A data processing system comprising:
   an interconnect;
   a central processing unit coupled to the interconnect;
   a memory coupled to the interconnect, the memory is accessed by the central processing unit via the interconnect;
   a debug circuit coupled to the interconnect, the debug circuit including:
      a trace module;
      a watchpoint module;
      a trace message buffer;
      a debug control module configured to
         detect a specified system event,
         examine a plurality of messages in the trace message buffer for at least one characteristic, and
         selectively remove at least a portion of one or more of the plurality of messages that have the at least one characteristic, wherein the at least one characteristic includes size of a message.

10. The system of claim 9 wherein the debug control module includes a control register having a parameter that indicates whether the ability to remove the at least a portion of one or more of the messages is enabled.

11. The system of claim 9 wherein the debug control module is further configured to:
    remove the at least a portion of one or more of the messages that have the at least one characteristic based on the fullness of the trace message buffer.

12. A method comprising:
    detecting an occurrence of a watchpoint event for debugging a computer processing system;
    flushing at least a portion of at least one of a plurality of messages in a trace message buffer in the computer processing system upon detecting the occurrence of the watchpoint event, wherein a characteristic of the at least one of the messages matches a specified characteristic; and
    adding a correlation message in the trace message buffer to indicate when the at least a portion of one or more of the messages has been flushed.

13. The method of claim 12 wherein the flushing is performed to enable the trace message buffer to accommodate additional messages associated with the watchpoint event.

14. The method of claim 12 further comprising:
    setting a flush control parameter to enable or disable the flushing.

15. The method of claim 12 wherein:
the at least a portion of the at least one of the plurality of message includes one of a group consisting of an address portion, a timestamp portion, and a process identifier portion.

16. The method of claim 12 wherein:
the specified characteristic is one of a group consisting of: a specified percentage of the oldest of the plurality of messages, a specified percentage of the newest of the plurality of messages, non-program messages, a specified priority of a message, and a specified length of a message.

17. The method of claim 16, wherein:
the plurality of messages are data trace messages.

18. The method of claim 12 further comprising:
compressing remaining messages in the trace message buffer when the at least a portion of one or more of the messages has been flushed.

19. The method of claim 18 wherein:
the plurality of messages are watchpoint trace messages.

20. The method of claim 12 further comprising:
flushing the at least a portion of the one or more of the messages based on a capacity of the trace message buffer and a number of messages in the trace message buffer that do not match the specified characteristic.

* * * * *